US009581197B2

(12) United States Patent
Moratz

(10) Patent No.: US 9,581,197 B2
(45) Date of Patent: Feb. 28, 2017

(54) BALL BEARING WITH INTEGRATED BUSHING

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/858,084

(22) Filed: Sep. 18, 2015

(65) Prior Publication Data

US 2016/0123394 A1 May 5, 2016

Related U.S. Application Data

(60) Provisional application No. 62/072,166, filed on Oct. 29, 2014.

(51) Int. Cl.
*F16C 33/58* (2006.01)
*F16C 33/40* (2006.01)
*F16C 43/06* (2006.01)
*F16C 19/08* (2006.01)
*F16C 33/76* (2006.01)
*F16C 19/55* (2006.01)
*F16C 25/08* (2006.01)

(52) U.S. Cl.
CPC ............ *F16C 33/585* (2013.01); *F16C 19/08* (2013.01); *F16C 19/55* (2013.01); *F16C 25/08* (2013.01); *F16C 33/40* (2013.01); *F16C 33/586* (2013.01); *F16C 33/768* (2013.01); *F16C 43/065* (2013.01); *Y10T 29/4968* (2015.01)

(58) Field of Classification Search
CPC .......... F16C 19/08; F16C 19/26; F16C 19/55; F16C 33/32; F16C 33/40; F16C 33/66; F16C 33/063; F16C 33/042; F16C 33/067; F16C 43/08; F16C 33/768; F16C 33/7803; Y10T 29/4968; Y10T 29/49686; Y10T 29/49696
USPC ....... 384/488, 490, 504, 507, 510, 515–516, 384/523, 543, 564, 592, 609, 612, 528; 29/898.061, 898.064, 898.065
See application file for complete search history.

(56) References Cited

U.S. PATENT DOCUMENTS 2,427,253 A * 9/1947 Browne ................. F01B 1/062
                                                        418/57
2,652,296 A * 9/1953 Palmgren ................ F16C 19/28
                                                        384/459
3,168,360 A * 2/1965 Dorl ...................... F16C 19/182
                                                        384/514

(Continued)

FOREIGN PATENT DOCUMENTS

GB         108145 A   *  7/1917   ............ F16C 19/183
GB       2217793 A   *  11/1989

(Continued)

*Primary Examiner* — Marcus Charles
(74) *Attorney, Agent, or Firm* — Simpson & Simpson, PLLC

(57) ABSTRACT

A bearing including: an inner race; an outer race arranged to rotate freely relative to the inner race by a first plurality of rolling elements and including a circumferentially disposed channel arranged on a first radially outermost surface of the outer race; a cage located in the circumferentially disposed channel and including a first plurality of apertures; and a second plurality of rolling elements disposed in the first plurality of apertures.

17 Claims, 6 Drawing Sheets

(56) References Cited

U.S. PATENT DOCUMENTS

| | | | | |
|---|---|---|---|---|
| 4,428,628 | A * | 1/1984 | Brown | F16C 19/28 384/467 |
| 4,770,550 | A * | 9/1988 | Takahashi | B65H 27/00 226/194 |
| 5,348,382 | A * | 9/1994 | Ebaugh | F04B 9/042 303/116.4 |
| 5,842,405 | A * | 12/1998 | Schaefer | F04B 1/0413 417/273 |
| 6,176,623 | B1 * | 1/2001 | Zeigler | F16C 19/46 29/898.062 |
| 6,202,538 | B1 * | 3/2001 | Scharinger | F04B 1/0413 384/447 |
| 6,220,760 | B1 * | 4/2001 | Ruoff | B60T 8/4031 384/447 |
| 6,240,826 | B1 * | 6/2001 | Zernickel | F04B 1/0417 384/447 |
| 6,579,073 | B1 * | 6/2003 | Burgdorf | B60T 8/4031 417/273 |
| 2013/0206087 | A1 * | 8/2013 | Tadokoro | F01L 1/352 123/90.15 |
| 2013/0272638 | A1 | 10/2013 | Mola et al. | |

FOREIGN PATENT DOCUMENTS

| | | | |
|---|---|---|---|
| JP | 01269713 A | * | 10/1989 |
| JP | 2002039188 | | 2/2002 |
| JP | 2006153153 | | 6/2006 |
| JP | 2013076441 | | 4/2013 |
| KR | 1020140115080 | | 9/2014 |

* cited by examiner

BALL BEARING WITH INTEGRATED BUSHING

CROSS-REFERENCE TO RELATED APPLICATIONS

This application claims the benefit under 35 U.S.C. §119 (e) of U.S. Provisional Patent Application No. 62/072,166, filed Oct. 29, 2014, which application is incorporated herein by reference in its entirety.

TECHNICAL FIELD

The present disclosure relates generally to a ball bearing, and, more specifically, to a ball bearing with a cage and rolling element configuration on the outer race to prevent seizing of the bearing while in operation.

BACKGROUND

Ball bearings have been used for many different mechanical applications. A ball bearing is often used when a rotatable shaft must be mounted within a housing. The insertion of a ball bearing reduces the friction that would occur between the shaft and the housing if the shaft were to ride directly on the surface of the housing. This would lead to grinding and eventual failure of the shaft or housing. Since a ball in a ball bearing is free to rotate between an inner race and an outer race, little to no friction occurs between the shaft and housing.

As the shaft rotates, heat can build up within the bearing and shaft causing axial expansion of the shaft. If the bearing is fixedly mounted within the housing and cannot be axially displaced, the bearing can seize and bind to the housing causing bearing damage due to induced axial load. This seizing of the bearing can be detrimental to a machine which is operating at high speeds and high heat since the shaft can no longer rotate with little to no friction.

A solution to avoid seizing of a ball bearing is to insert a linear bearing cartridge with the ball bearing. This solution addresses the problem of a bearing seizing with the housing since the linear bearing enables axial expansion of the rotating shaft. A problem with using a linear bearing cartridge, though, is that a linear bearing cartridge requires a large amount of space to be installed properly with a ball bearing. Additionally, a linear bearing is an expensive additional component.

Thus, there has been a long-felt need for a ball bearing that can rotate at high speed and has integrated components within the bearing in order to enable for axial expansion of a rotating shaft to prevent seizing of the bearing with the housing.

SUMMARY

According to aspects illustrated herein, there is provided a bearing arranged to reduce friction between a housing and a rotating shaft, including: an inner race; an outer race arranged to rotate freely relative to the inner race and including a circumferentially disposed channel forming a portion of a first radially outermost surface of the outer race; a cage located in the channel and comprising a first plurality of apertures; and a plurality of rolling elements, each rolling element in the plurality of rolling elements disposed in a respective aperture included in the first plurality of apertures.

According to aspects illustrated herein, there is provided a bearing arranged to reduce friction between a housing and a rotating shaft including: an inner race; an outer race arranged to rotate freely relative to the inner race and including a circumferentially disposed channel forming a portion of a first radially outermost surface of the outer race; a cage located in the channel and including a first plurality of apertures and a second radially outermost surface; and a plurality of rolling elements. Each rolling element in the plurality of rolling elements is disposed in a respective aperture included in the first plurality of apertures and extends radially past the second radially outermost surface.

According to aspects illustrated herein, there is provided a method of axially displacing a ball bearing disposed in a housing and including an outer race and an inner race through which a shaft passes, including: contacting the housing with a plurality of rolling elements disposed in a plurality of apertures in a cage wrapped about an outer surface of the outer race; contacting the outer surface of the outer race with the plurality of rolling elements; axially displacing the shaft; and rolling the plurality of rolling elements within the plurality of apertures so that the ball bearing axially displaces with the shaft and with respect to the housing.

BRIEF DESCRIPTION OF THE DRAWINGS

The nature and mode of operation of the present invention will now be more fully described in the following detailed description of the invention taken with the accompanying figures, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly described herein can be driven by hydraulics, electronics, and/or pneumatics.

Figure 1:
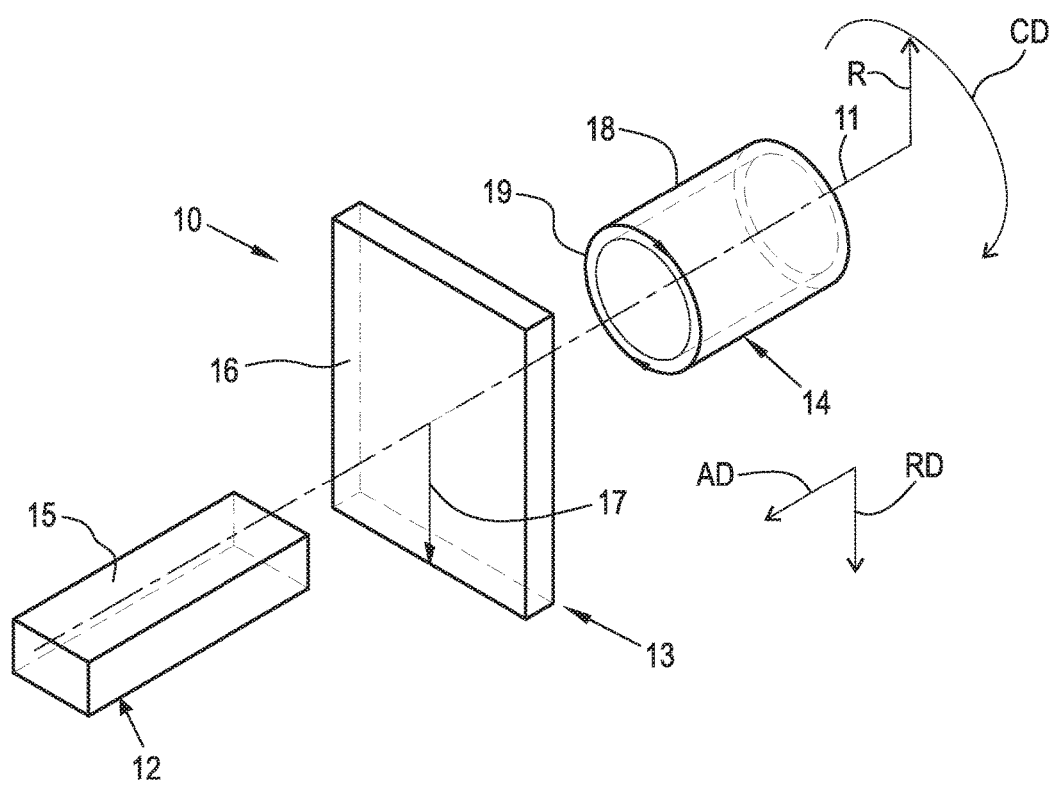
FIG. 1 is a perspective view of a cylindrical coordinate system demonstrating spatial terminology used in the present disclosure.

FIG. 1 is a perspective view of cylindrical coordinate system 10 demonstrating spatial terminology used in the present disclosure. The present disclosure is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
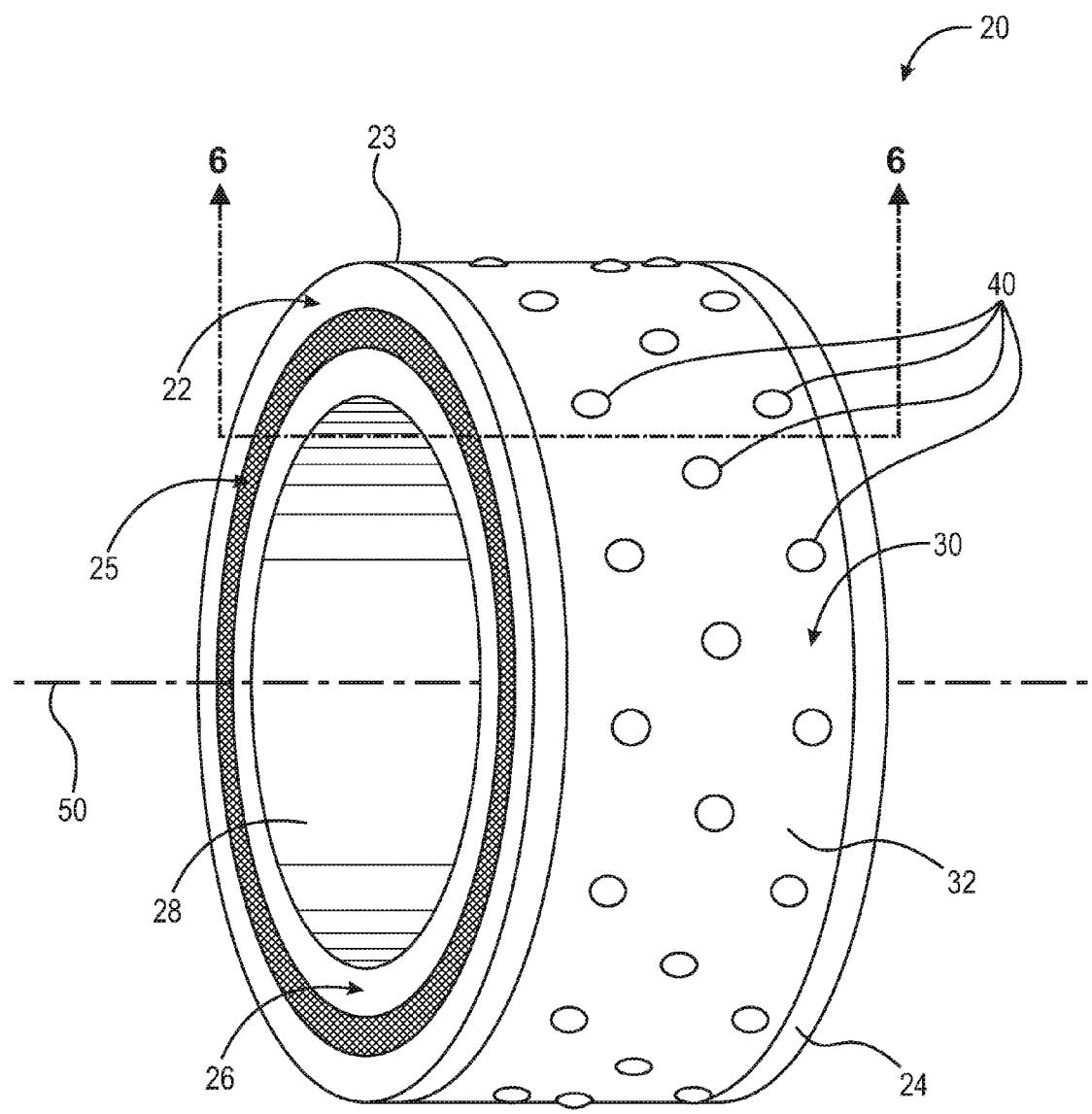
FIG. 2 is a perspective view of bearing 20.

Adverting now to the figures, FIG. 2 is a perspective view of bearing 20. Bearing 20 broadly includes outer race 22, seal 25, inner race 26, cage 30, and rolling elements 40. As seen in the figure, cage 30 is operatively arranged on outer race 22 to enable axial expansion of a rotating shaft (not shown) passing through inner race 26. Additionally, rolling elements 40 are retained and secured within cage 30 after cage 30 is secured to outer race 22. It is important to note that outer race 22 can rotate independently of inner race 26 due to internal rolling elements (shown in FIG. 6) arranged between outer race 22 and inner race 26. Seal 25 is arranged between outer race 22 and inner race 26 to prevent contaminants from interacting with the internal rolling elements. While in operation, bearing 20 is arranged between a housing (shown in FIG. 6) and a rotating shaft, with rolling elements 40 engaged with the housing and surface 28 of inner race 26 engaged with the rotating shaft. Inner race 26 rotates about axis 50 while in operation. Rolling elements 40 are secured within cage 30 to enable free rotation of each individual rolling element 40 enabling bearing 20 to be axially displaced along axis 50 without inducing a preload on bearing 20. Due to the arrangement of cage 30 and rolling elements 40, a preload cannot be induced on bearing 20 since bearing 20 can be axially displaced to match the axial expansion of the rotating shaft.

Figure 3:
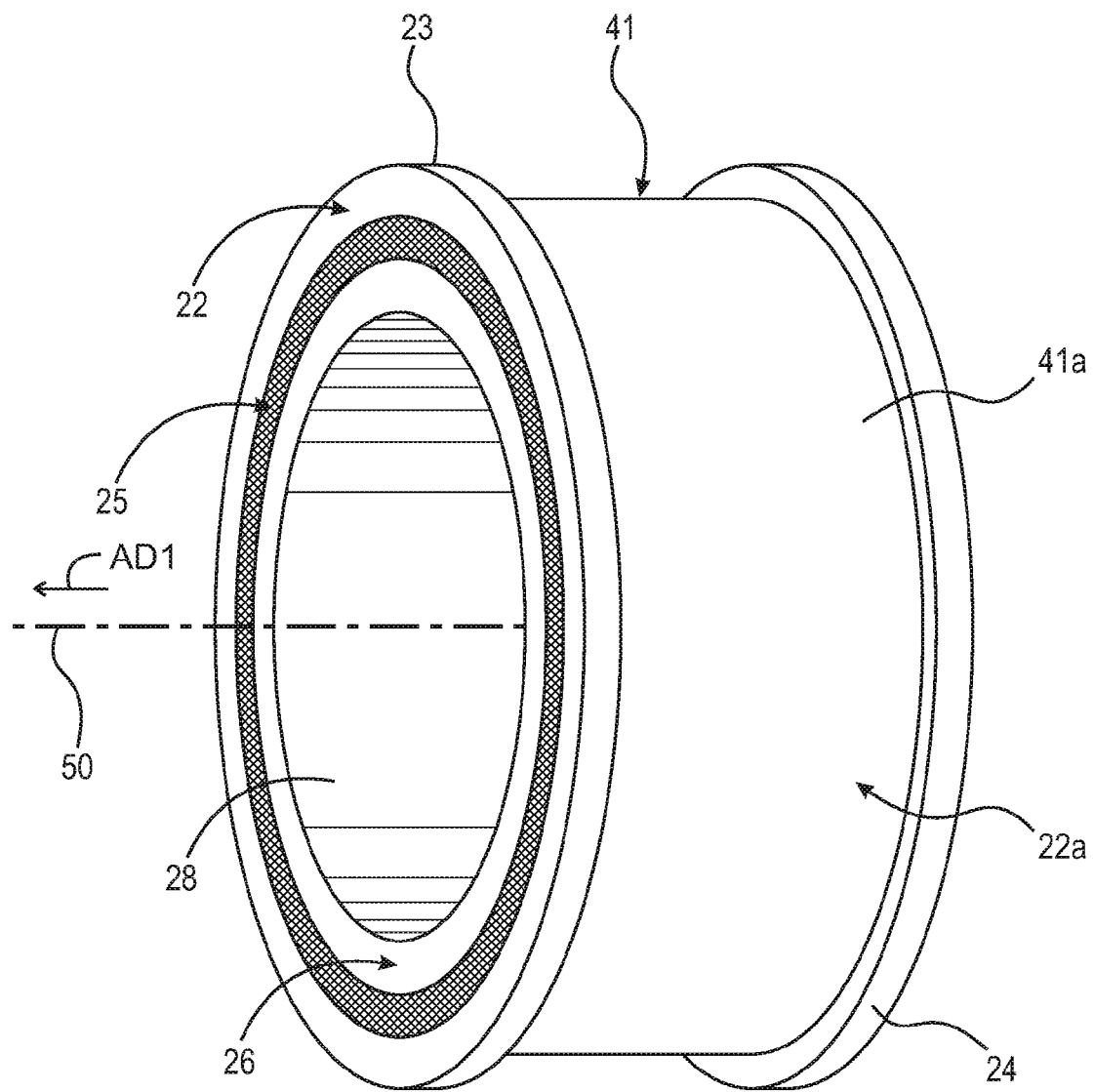
FIG. 3 is a perspective view of bearing 20 with cage 30 removed.

FIG. 3 is a perspective view of bearing 20 with cage 30 removed. As shown in the figure, circumferentially disposed channel 22a forms portion 41a of radially outermost surface 41 of the outer race. Channel 22a is axially disposed between rim 23 and rim 24 of outer race 22. When cage 30 is arranged within channel 22a and rolling elements 40 are retained within cage 30 (shown in FIG. 2), rolling elements 40 engage portion 41a of outer race 22 and enable bearing 20 to be axially displaced. Cage 30 is axially secured to outer race 22 by rim 23 and rim 24. In order to ensure rolling elements 40 are the only components of bearing 20 in contact with the housing, rolling elements 40 extend radially past rims 22 and 23.

Figure 4:
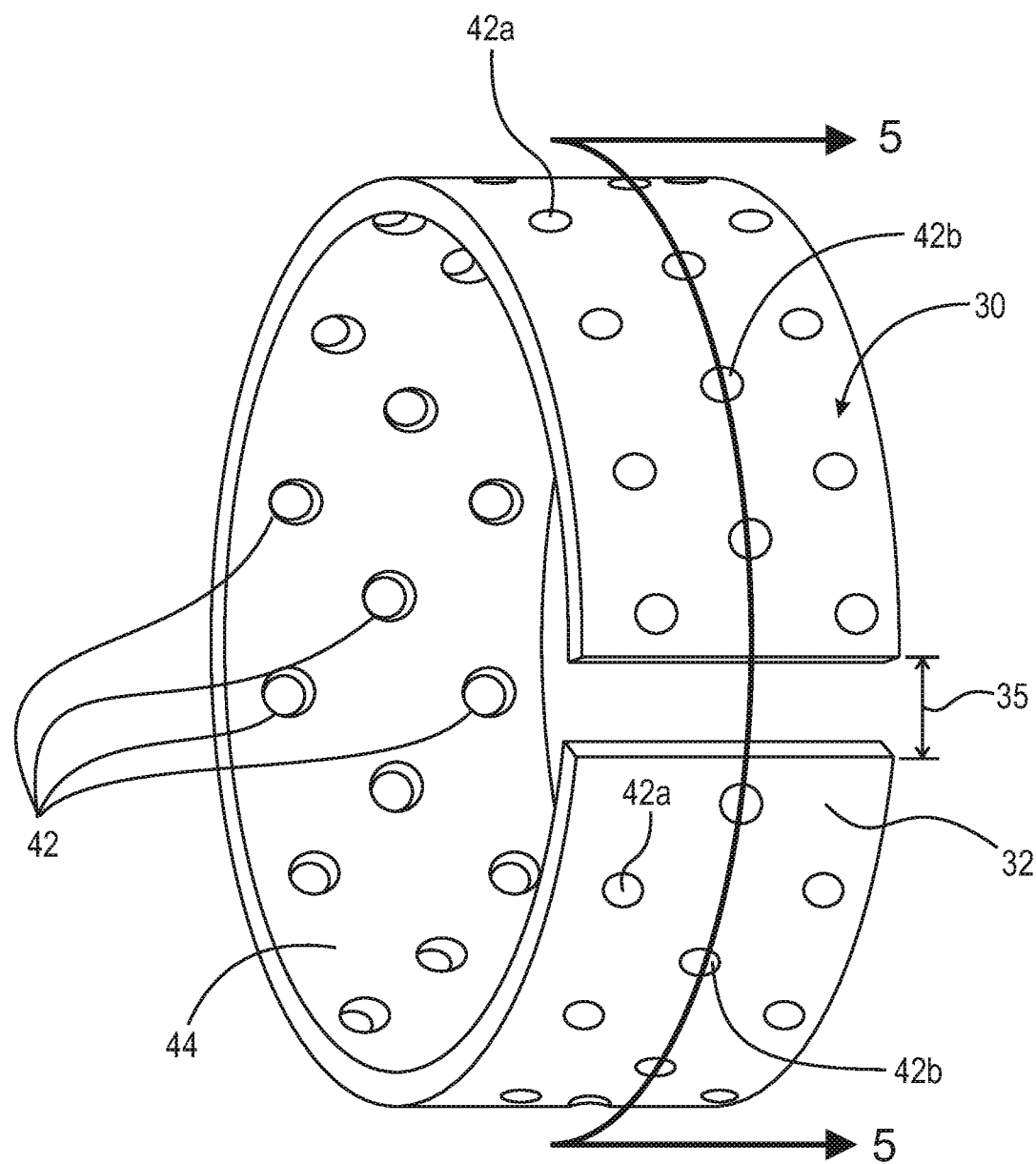
FIG. 4 is a perspective view of cage 30 with rolling elements 40 removed.

FIG. 4 is a perspective view of cage 30 with rolling elements 40 removed. Cage 30 includes apertures 42 which are tapered through-bores that enable rolling elements 40 to engage the surface of the housing and surface 41a of outer race 22 (shown in FIG. 3). Since apertures 42 are tapered such that apertures 42 have a smaller diameter on radially outermost surface 32 when compared to the diameter of apertures 42 on radially inner most surface 44, rolling elements 40 are snapped into cage 30 and retained by apertures 42 and surface 22b of outer race 22 (shown in FIG. 3). It should be appreciated however, that the use of different arrangements of apertures 42 is possible and considered to be within the scope of the claims. In an example embodiment, cage 30 is manufactured from a single piece of flexible material such as plastic; but, other materials can be used. Gap 35 enables cage 30 to be snapped into channel 22a of outer race 22 while cage 30 remains a single component. In an example embodiment, cage 30 includes two halves which are secured together within channel 22a of outer race 22. In an example embodiment: apertures 42a extend circumferentially about the cage (two example apertures are shown) and are circumferentially aligned with each other; apertures 42b extend circumferentially about the cage (two example apertures are shown) and are circumferentially aligned with each other; and the respective apertures 42a and 42b are not aligned with each other in axial direction AD.

Figure 5:
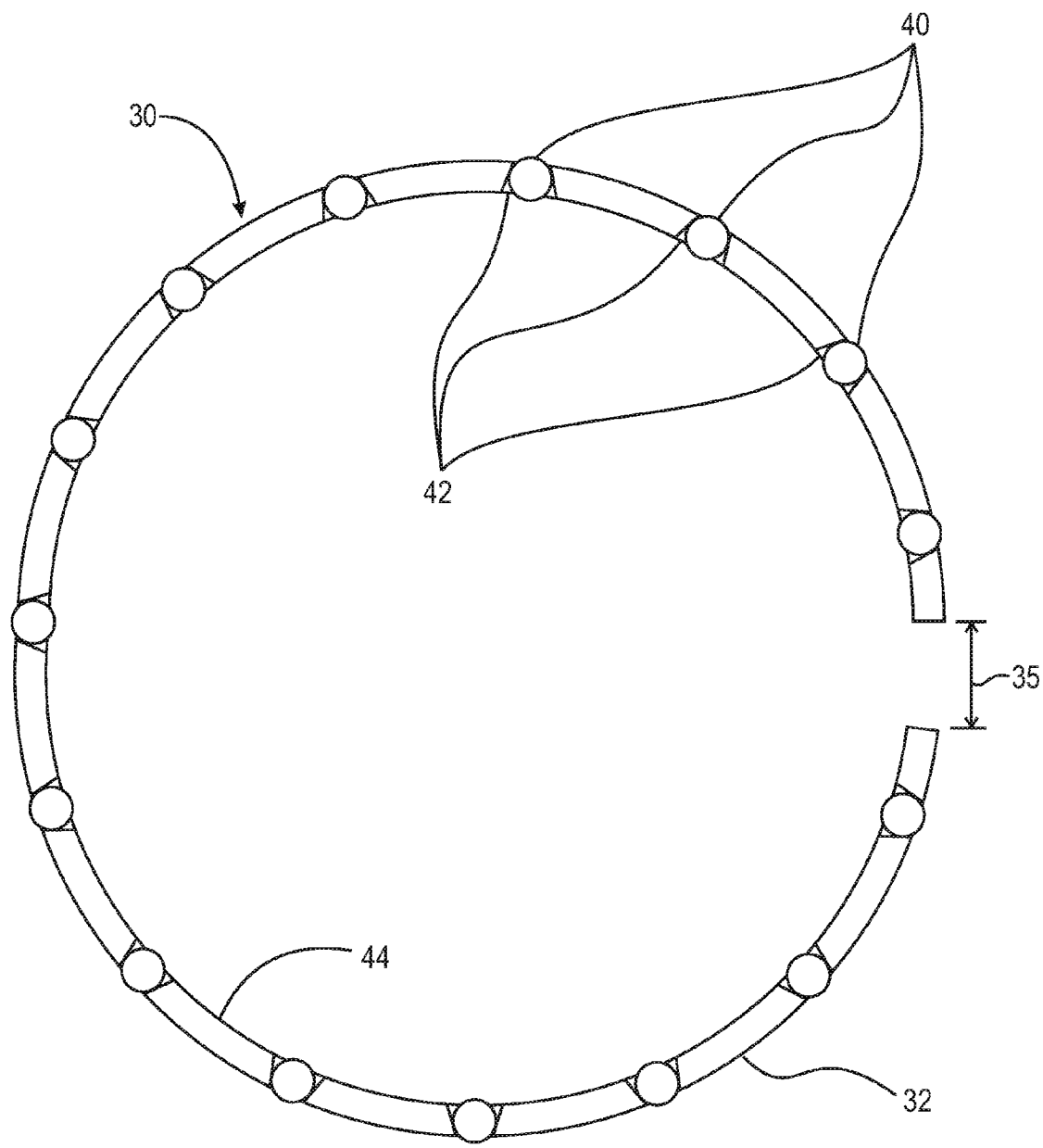
FIG. 5 is a cross-sectional view of cage 30 with rolling elements 40 taken generally along line 5-5 in FIG. 4; and, FIG. 6 is a cross-sectional view of bearing 20 taken generally along line 6-6 in FIG. 2 including housing 51.

FIG. 5 is a cross-sectional view of cage 30 with rolling elements 40 taken generally along line 5-5 in FIG. 4. As shown in the figure, apertures 42 are tapered radially outward to ensure rolling elements 40 are retained within cage 30. Additionally, it can be seen that rolling elements 40 extend radially outward at a greater distance than surface 32 of cage 30. In order to install rolling elements 40 into cage 30, cage 30 is arranged within channel 22a of outer race 22 (shown in FIG. 2). Rolling elements 40 are snapped into apertures 42 of cage 30, with cage 30 being made of a flexible material.

Figure 6:
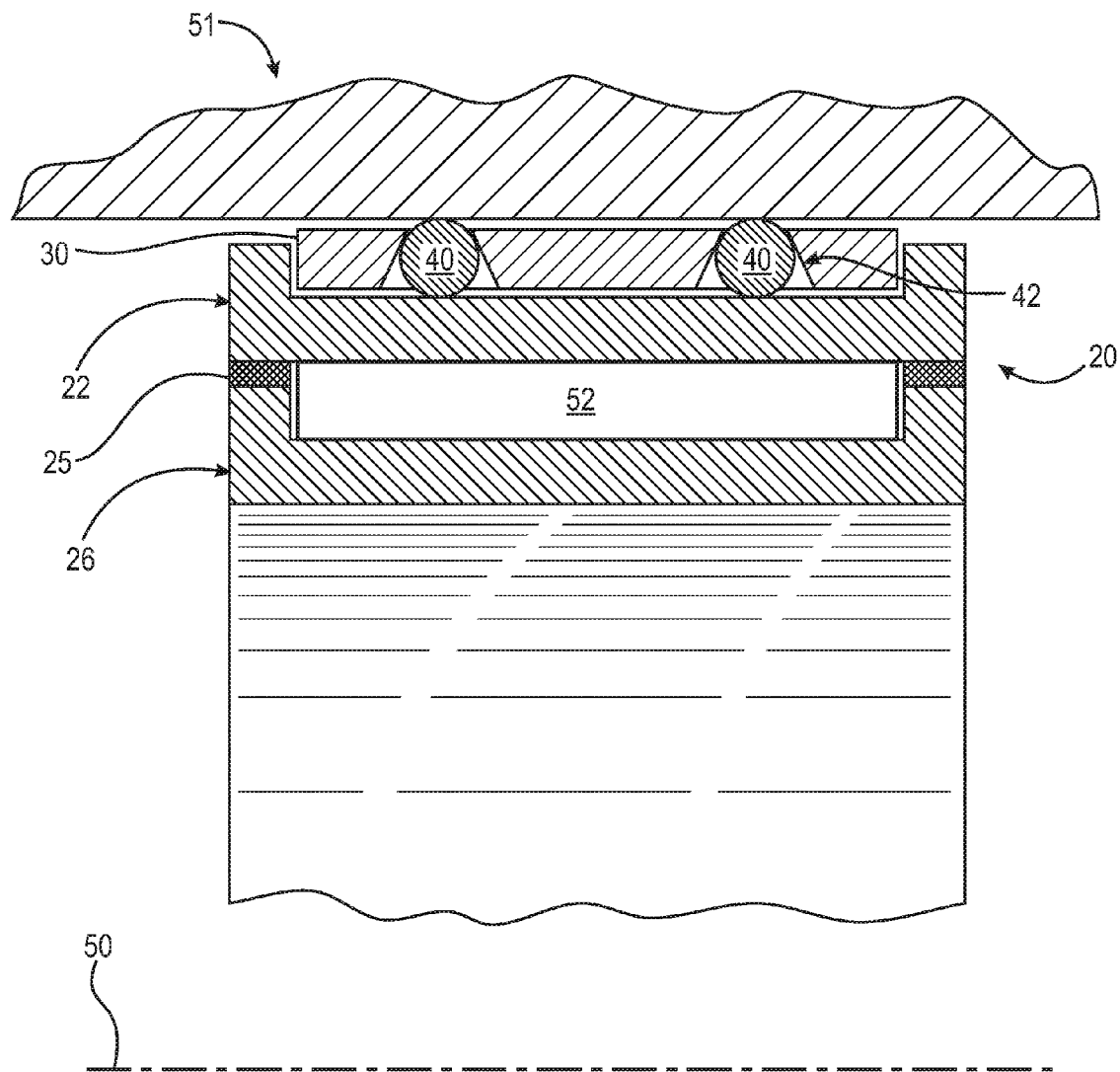

FIG. 6 illustrates bearing 20 including outer race 22, inner race 26, cage 30, and rolling elements 40. Rolling elements 40 are retained and secured within cage 30 and contact housing 51. Outer race 22 is rotatable relative to inner race 26 via rolling elements 52 arranged between outer race 22 and inner race 26. Bearing 20 rotates about axis 50 in operation.

Advantageously, bearing 20 addresses the binding problem noted above. That is, as a shaft passing through bearing 20 and essentially fixed to inner race 26 axially expands, for example due to heating of the shaft, elements 40 in cage 30 enable cage 30 and bearing 20, as a whole, to slide along the housing, rather than having outer race 22 bind against the housing.

It will be appreciated that various aspects of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 20 bearing
22 outer race
22a channel
22b surface
23 rim 24 rim
25 seal
26 inner race
28 surface
30 cage
32 surface
35 gap
40 rolling elements
41 radially outermost surface
41a portion of radially outermost surface
42 apertures
42a apertures
42b apertures
44 surface
50 axis
51 housing
52 rolling elements

What is claimed is:

1. A bearing arranged to reduce friction between a housing and a rotating shaft, comprising:
an inner race arranged to be mounted on the rotating shaft;
an outer race assembly comprising:
an outer race arranged to rotate freely relative to the inner race by a first plurality of rolling elements;
a circumferentially disposed channel arranged on a first radially outermost surface of the outer race;
a cage located in the circumferentially disposed channel and including a first plurality of apertures; and,
a second plurality of rolling elements arranged in the first plurality of apertures and contacting the housing such that the bearing is movable relative to the housing.

2. The bearing as recited in claim 1, wherein:
the cage includes a second radially outermost surface; and,
the second plurality of rolling elements extend radially past the second radially outermost surface.

3. The bearing as recited in claim 1, wherein:
the first radially outermost surface includes first and second lips;
the circumferentially disposed channel is axially disposed between the first and second lips; and,
the plurality of rolling elements extend radially past the first and second lips.

4. The bearing as recited in claim 1, wherein the second plurality of rolling elements are in contact with the first radially outermost surface.

5. The bearing as recited in claim 1, wherein:
the cage includes a first radially innermost surface and a second radially outermost surface; and,
each aperture in the first plurality of apertures includes:
a respective first opening at the first radially inmost surface having a first diameter; and,
a respective second opening at the second radially outermost surface having a second diameter less than the first diameter.

6. The bearing as recited in claim 5, wherein each rolling element in the second plurality of rolling elements is a sphere having a third diameter less than the first diameter and greater than the second diameter.

7. The bearing as recited in claim 1, wherein:
the first plurality of apertures includes second and third pluralities of apertures;
respective apertures in the second plurality of apertures are aligned in a circumferential direction; and,
respective apertures in the third plurality of apertures are aligned in the circumferential direction and off-set from the second plurality of apertures in an axial direction.

8. The bearing as recited in claim 7, wherein the respective apertures in the second plurality of apertures are axially misaligned with the respective apertures in the third plurality of apertures.

9. A bearing arranged to reduce friction between a housing and a rotating shaft, comprising:
an inner race arranged to be mounted on the rotating shaft;
an outer race arranged to rotate freely relative to the inner race by a first plurality of rolling elements and including a circumferentially disposed channel arranged on a first radially outermost surface of the outer race;
a cage located in the circumferentially disposed channel and including a first plurality of apertures and a second radially outermost surface; and,
a second plurality of rolling elements, each rolling element in the plurality of rolling elements disposed in a respective aperture included in the first plurality of apertures and extending radially past the second radially outermost surface.

10. The bearing as recited in claim 9, wherein:
the first radially outermost surface includes first and second lips;
the circumferentially disposed channel is axially disposed between the first and second lips; and,
the second plurality of rolling elements extend radially past the first and second lips.

11. The bearing as recited in claim 9, wherein the second plurality of rolling elements are in contact with the portion of the first radially outermost surface.

12. The bearing as recited in claim 9, wherein:
the cage has a first radially innermost surface and a third radially outermost surface; and,
each aperture in the first plurality of apertures has:
a respective first opening at the first radially inmost surface having a first diameter; and,
a respective second opening at the third radially outermost surface having a second diameter less than the first diameter.

13. The bearing as recited in claim 12, wherein each rolling element in the second plurality of rolling elements is a sphere having a third diameter less than the first diameter and greater than the second diameter.

14. The bearing as recited in claim 9, wherein:
the first plurality of apertures includes second and third pluralities of apertures;
respective apertures in the second plurality of apertures are aligned in a circumferential direction; and,
respective apertures in the third plurality of apertures are aligned in the circumferential direction and off-set from the second plurality of apertures in an axial direction.

15. The bearing as recited in claim 14, wherein the respective apertures in the second plurality of apertures are axially misaligned with the respective apertures in the third plurality of apertures.

16. A method of reducing friction between a housing and a rotating shaft including a bearing, comprising:
mounting an inner race on the rotating shaft;
arranging an outer race to rotate freely relative to the inner race by a first plurality of rolling elements, the outer race including a circumferentially disposed channel arranged on a first radially outermost surface of the outer race;
securing a cage in the circumferentially disposed channel, the cage including a first plurality of apertures; and, retaining a second plurality of rolling elements in the first plurality of apertures, the second plurality of rolling elements contacting the housing such that the bearing is movable relative to the housing.

17. The method as recited in claim 16, further comprising:
circumferentially and axially restraining the second plurality of rolling elements with the cage.

* * * * *